United States Patent
Fang

(10) Patent No.: US 8,340,458 B2
(45) Date of Patent: Dec. 25, 2012

(54) SYSTEMS AND METHODS FOR PROCESSING IMAGE PIXELS IN A NUCLEAR MEDICINE IMAGING SYSTEM

(75) Inventor: Joseph Y. Fang, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 83 days.

(21) Appl. No.: 13/102,122

(22) Filed: May 6, 2011

(65) Prior Publication Data
US 2012/0281891 A1 Nov. 8, 2012

(51) Int. Cl.
*G06K 9/40* (2006.01)
(52) U.S. Cl. ......... 382/261; 382/260; 382/265; 382/266
(58) Field of Classification Search ........... 382/260–266
See application file for complete search history.

(56) References Cited

U.S. PATENT DOCUMENTS

| | | | |
|---|---|---|---|
| 6,269,195 B1 | 7/2001 | Gonsalves et al. | |
| 7,092,965 B2 * | 8/2006 | Easwar | 1/1 |
| 7,437,013 B2 * | 10/2008 | Anderson | 382/261 |
| 7,570,832 B2 * | 8/2009 | Chui et al. | 382/260 |
| 8,139,075 B2 * | 3/2012 | Cohen et al. | 345/582 |
| 8,169,216 B2 * | 5/2012 | Yanasak | 324/307 |
| 2003/0016371 A1 * | 1/2003 | Shaw | 358/1.9 |
| 2004/0208390 A1 * | 10/2004 | Jiang et al. | 382/260 |
| 2005/0276504 A1 * | 12/2005 | Chui et al. | 382/264 |
| 2010/0284467 A1 * | 11/2010 | Sekiguchi et al. | 375/240.16 |

* cited by examiner

*Primary Examiner* — Wesley Tucker
(74) *Attorney, Agent, or Firm* — Peter Kendall

(57) ABSTRACT

A system and method for smoothing digital images using a non-orthogonal convolution kernel involves steps for rearranging and remapping input image data and the convolution kernel image from hexagonal coordinate mapping to orthogonal mapping of a memory space thus enabling implementation of a general box filter convolution strategy to smooth the input image.

3 Claims, 12 Drawing Sheets

SYSTEMS AND METHODS FOR PROCESSING IMAGE PIXELS IN A NUCLEAR MEDICINE IMAGING SYSTEM

TECHNICAL FIELD

The present disclosure is generally related to nuclear medicine imaging systems and, more particularly, is related to systems and methods for processing image pixels in a nuclear medicine imaging system.

BACKGROUND

Smoothing of a digital image can be effectively implemented by averaging all pixels in a rectangular (box) neighborhood of a region (mask). This is known in the art as box filter. The box filter method runs independent of the box (filter kernel) size. However, the performance optimization of the box filter is based on the box shaped filter kernel. If a different shape filter kernel required smoothing, a 2-dimensional convolution has to be employed. This, however, takes longer time because of the increased calculations and the performance is dependent on the filter kernel size. The larger the filter kernel the longer it will take to smooth the digital image.

Typically, in a single photon emission computed tomography (SPECT), an iterative image reconstruction method uses models for a point-spread function (PSF) to improve spatial resolution in the reconstructed images. In order to accurately replicate the physical response of a collimator of the SPECT, the PSF models often depend on a bore shape of the collimator channels and distance between the collimator and an object. The bore shape of the collimator channels can be circular, rectangular, or hexagonal. The PSF models are depth dependent with the extent of the modeling function widening two (2) dimensions (e.g., width and height of the detected area) as the distance of the object from the collimator increases. The most time-consuming part of the iterative reconstruction is the computations to model the PSF or convolutions with the distance dependent bore shaped uniform convolution kernel.

SUMMARY

A method for smoothing a digital image with various shape and size of filter kernels comprises the following steps: (a) calculating Skip-Lengths and Run-Lengths for each row of pixels in the non-orthogonal convolution kernel; (b) performing a convolution for the first anchor pixel in the input image to obtain a first smoothed output pixel data and storing the smoothed output pixel data in a data storage unit; (c) remapping the convolution kernel image into an orthogonal coordinate map of a memory space and generate a remapping template; (d) remapping the input image into the orthogonal coordinate of the memory space using the remapping template; (e) dividing the convolution kernel into two sections; (f) further dividing one of the two sections into two subsections and extending the two subsections in the remapped input image to cover all neighborhood pixels corresponding to all of the anchor pixels, the first extended subsection representing pixels that are inside the kernel and the second extended subsection representing pixels that are outside the kernel; (g) realigning the pair of extended subsections within the memory space in decrement order or increment order; (h) for the pair of extended subsections, summing the pixel values in each column and then substracting the summed values from the second extended subsection from the summed values from the first extended subsection and generate an array $H_{first\ section}$ representing the difference in the kernel values from one kernel to the next in the first section; (i) repeating the steps (f)-(h) for the second of the two sections and generating an array $H_{second\ section}$ representing the differences in the kernel values from one kernel to the next in the second section; (j) adding the arrays $H_{first\ section}$ and $H_{second\ section}$ to obtain a summed array H representing the differences in the kernel values from one kernel to the next associated with the anchor pixels other than the first anchor pixel; (k) adding the value of the first smoothed output pixel data to the first element of the summed array H and storing the result as the second smoothed output pixel data in the data storage unit; (l) adding the value of the most recently calculated smoothed output pixel data to the next element of the summed array H and storing the result as the next smoothed output pixel data in the sequence; and (m) repeating the step (l) until the last element of the summed array H is processed by the step (l) and storing the result as the smoothed output pixel data for the last anchor pixel.

The method of the present disclosure focuses on several techniques for organizing data elements into arrays, creating loop blocking by transforming the memory domain of misalignment into smaller chunks and realigned in memory space for maximizing data reuse. These techniques improve the performance for any shape of uniform convolution kernel for image smoothing.

The method of the present disclosure is useful for processing digital image pixels in a nuclear medicine imaging system. Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings in which.

While several embodiments are described in connection with these drawings, the invention is not intended to be limited to the embodiment or embodiments disclosed herein and the scope of the invention covers all alternatives, modifications, and equivalents.

DETAILED DESCRIPTION

The method of the present disclosure rearranges the image pixels based on a non-rectangular image convolution kernel shape to organize the pixels to alignment and contiguity of data access patterns so that general box filter convolution strategy can be applied for smoothing the input image without severe performance penalties during memory access. The method of the present disclosure uses two arrays to represent non-rectangular shaped convolution kernel in an orthogonal coordinate system so that a general box filter convolution strategy can be applied. The length of the two arrays is equal to the size of the convolution kernel's vertical dimension (the height) and the contents of the two arrays define the convolution kernel's horizontal dimension (the width). One of the two arrays carries the skip length of the kernel (representing the number of pixels not in the convolution kernel) and the other array carries the run length (representing the number of pixels that are in the convolution kernel). Once the non-rectangular convolution kernel is presented in an orthogonal coordinate system, a general box filter convolution strategy can be applied to smooth the input image. This concept will be illustrated using a hexagonal shaped convolution kernel as an example.

Figure 1:
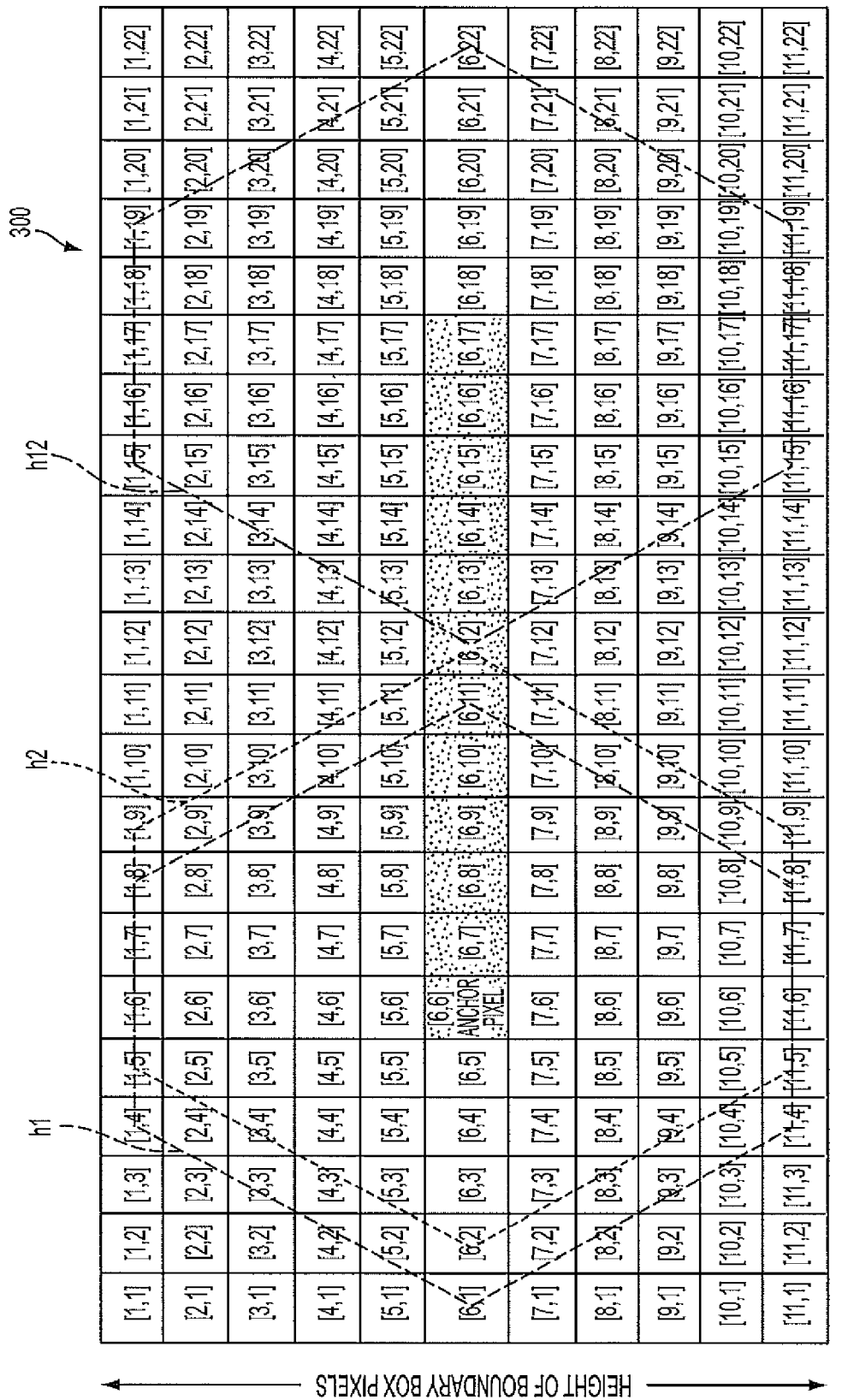
FIG. 1 illustrates an example of an input image to be smoothed using a hexagonal convolution kernel according to the present disclosure.

FIG. 1 shows an input image 300 that is 11 pixels high by 22 pixels wide. In actual SPECT operation, an input image could be much larger than the example input image 300 shown here but for the purpose of this description, the example input image 300 is selected to have this limited size. The 242 pixels in the input image 300 are labeled using a row-major convention notation inside a pair of brackets, i.e. [row, column].

According to an aspect of the present disclosure, a non-rectangular shaped convolution kernel is applied to smooth the input image 300, specifically a hexagonal shaped convolution kernel. For example, a hexagonal convolution kernel image h1 is shown overlaid onto the input image 300 centered over the pixel [6,6]. The pixel [6,6] is the pixel in the input image 300 that will be smoothed by the hexagonal convolution kernel image h1 and aligns with the center or the anchor pixel location of the hexagonal convolution kernel image h1.

The hexagonal convolution kernel employed here has 11×11 pixel size and, thus, twelve kernel images h1 through h12 will be required to smooth the input image 300. The twelve anchor pixels associated with the twelve kernel images h1 through h12 are shown with shading in FIG. 1. The twelve anchor pixels correspond to the pixels [6,6], [6,7], [6,8], [6,9], [6,10], [6,11], [6,12], [6,13], [6,14], [6,15], [6,16], and [6,17] of the input image 300. For purposes of illustration, only three of the twelve convolution kernel images h1, h2 and h12 are shown in FIG. 1. Thus, the particular number of convolution kernel images required to smooth an input image would depend on the size of the input image. For illustration purposes, only three of the twelve hexagonal convolution kernel images h1, h2 and h12 are identified in FIG. 1.

Figure 2A:
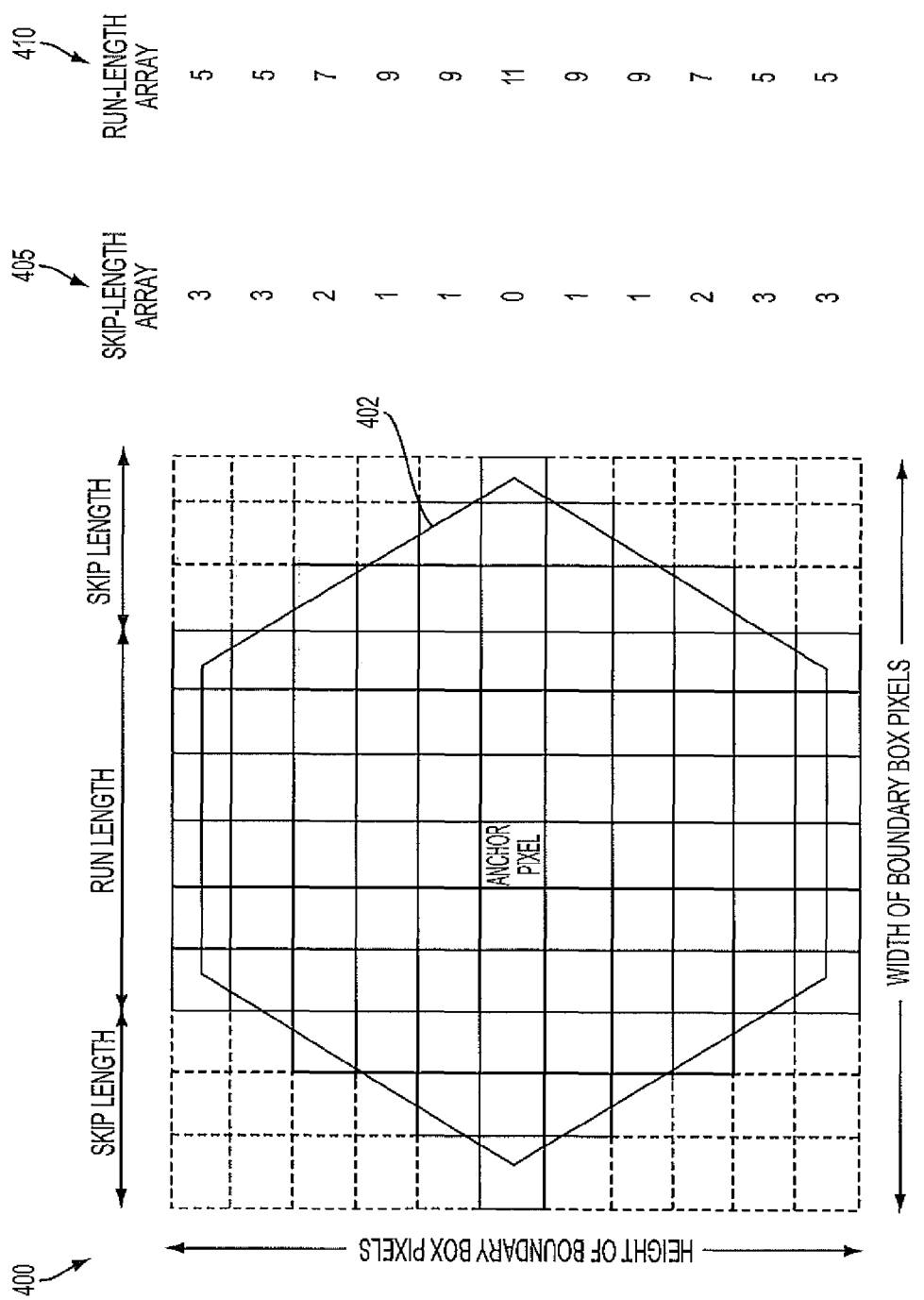
FIG. 2A shows a partial coordinate system for a hexagonal convolution kernel showing the Skip-Length array and a Run-Length array associated with the convolution kernel.

FIG. 2A shows one hexagonal convolution kernel image 402 of the present example in a boundary box area 400. The convolution kernel image 402 has a size that is defined by a 11×11 pixels boundary box area 400. Because the hexagonal convolution kernels is not box-shaped and does not occupy all of the pixels in the 11×11 boundary box area 400, the shape of the convolution kernel inside the boundary box area 400 is defined with Skip-Length array 405 and Run-Length arrays 410. The Run-Length array 410 contains the number of neighborhood pixels in each row, i.e. the pixels that are in the convolution kernel image. The Skip-Length array 405 contains values that represent half of the number of pixels in each row that are not the neighborhood pixels. For example, in the first row on top of the image shown in FIG. 2A, there are five neighborhood pixels in the center that are inside the convolution kernel image and, thus, the Run-Length value for the first row in the Run-Length array 410 is "5". There are six pixels that are not the neighborhood pixels, three on each side of the five neighborhood pixels. Thus, the Skip-Length value for the first row in the Skip-Length array 405 is "3". The Skip-Length array and Run-Length array of the convolution kernel image is calculated once by the image processor 240 and stored in the data storage unit 220 during the initialization step before the image smoothing process is executed.

The method of the present disclosure takes the non-rectangular shape of the convolution kernel image, remaps the convolution kernel image pixels from a hexagonal coordinate map to an orthogonal coordinate map using pre-calculated Skip-Length and Run-Length array information. The orthogonal coordinate map corresponds to the orthogonal coordinate system of the memory space in the data storage unit 220. Then, the pixels in the input image 300 is also rearranged using the hexagonal coordinate conversion described herein into an orthogonally aligned memory space based on the Skip-Length and Run-Length array information. This rearrangement and alignment of the input image pixel data into orthogonally aligned memory space allows the use of a general box filter convolution strategy for smoothing the input image 300 even when the filter kernel is non-rectangular. In other words, regardless of the particular shape of the non-rectangular filter kernel shape, a general box filter method can be used to smooth the input image.

Figure 2B:
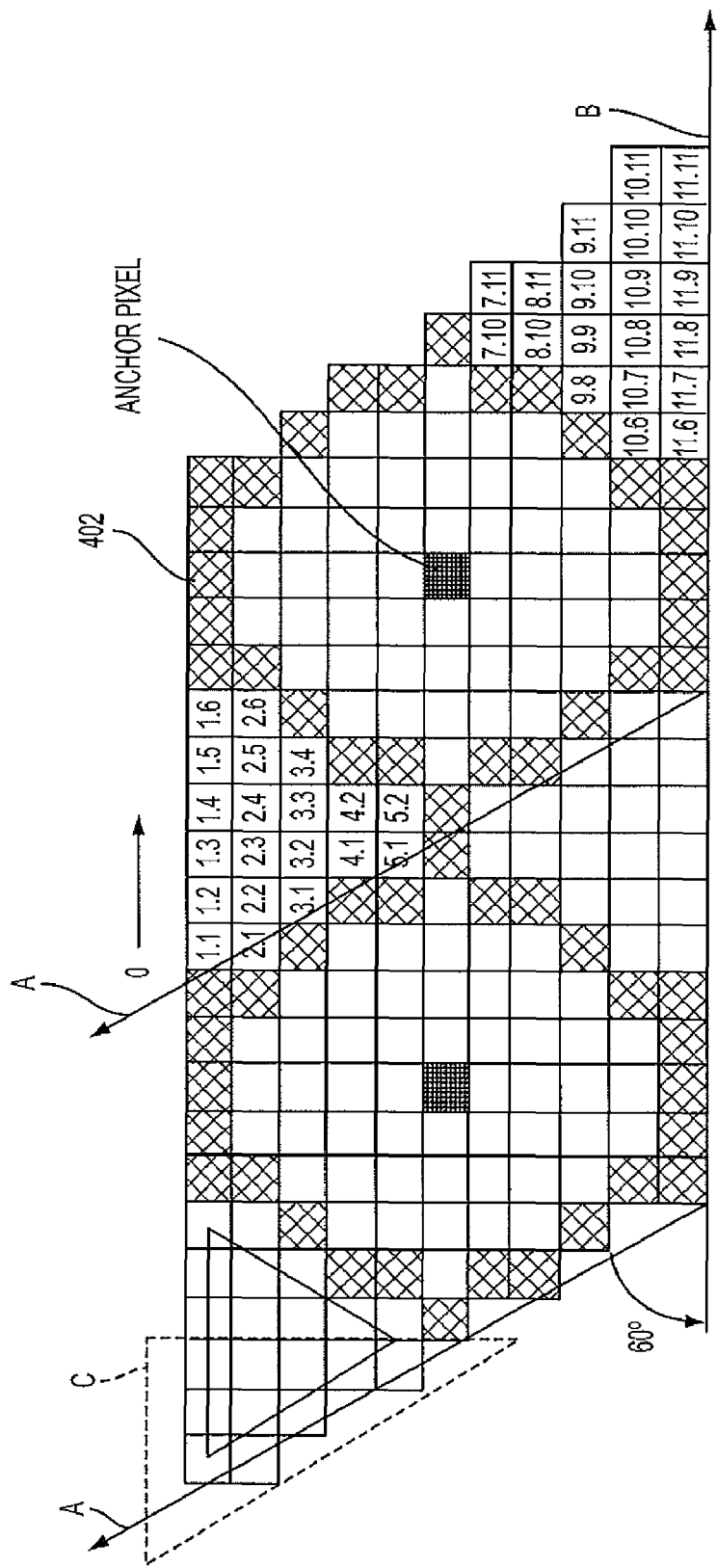
FIG. 2B illustrates a hexagonal coordinate system for representing a hexagonal kernel.

In order to explain the remapping of the convolution kernel image pixels from a hexagonal coordinate map to an orthogonal coordinate map of a memory space, FIG. 2B shows the hexagonal convolution kernel images defined in a hexagonal coordinate system. The hexagonal coordinate system is a non-orthogonal coordinate system defined by two axes A and B that form an angle of 120° with each other. In the example shown in FIG. 2B, two hexagonal kernel images are illustrated in the hexagonal coordinate system along with their respective group of 121 image pixels that define each kernel image's boundary box area associated with their respective anchor pixels. The anchor pixels are marked in dark color and the periphery pixels outlining the hexagonal kernel shape are shown in cross-hatches. The pixels that correspond to the convolution kernel 402 are labeled using (row, column) convention denoting their eventual location in the orthogonal coordinate map of the memory space in the data storage unit 220 after being remapped.

Figure 3A:
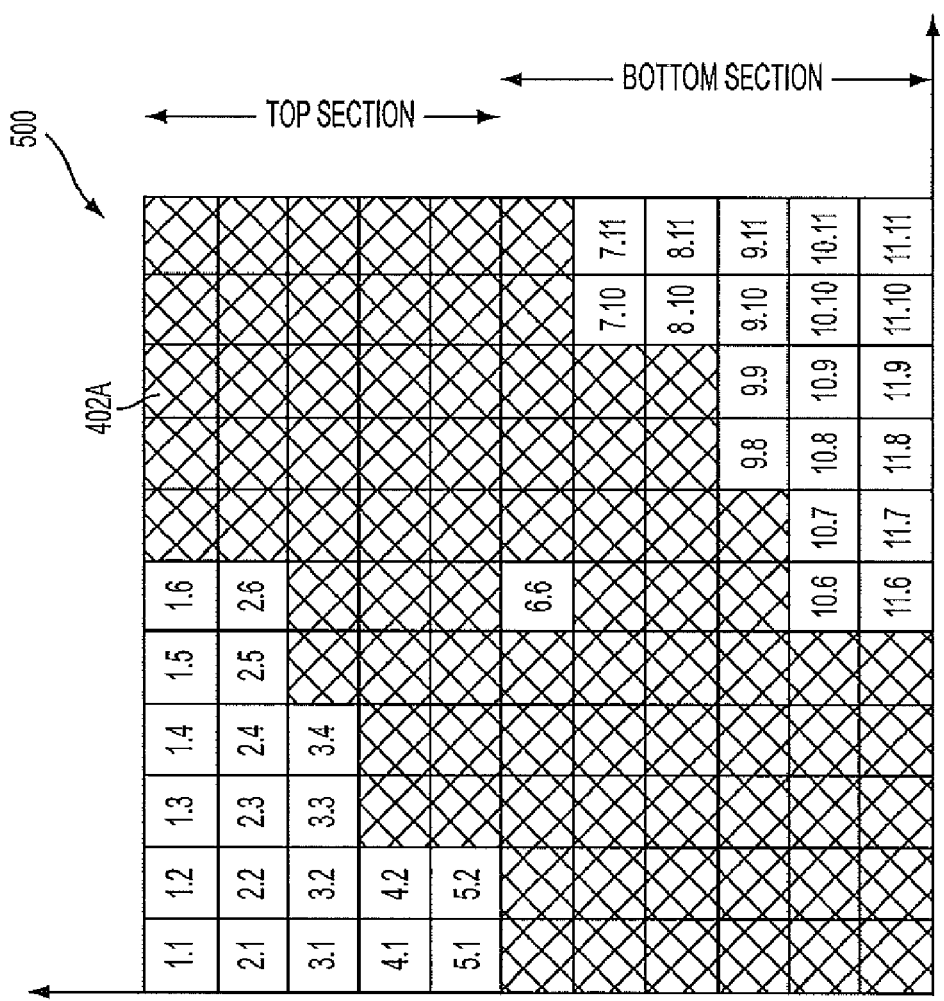
FIG. 3A illustrates the hexagonal convolution kernel of FIG. 2B remapped from the hexagonal coordinate system shown in FIG. 2B into an orthogonal coordinate map of a memory space.

FIG. 3A shows the remapped convolution kernel 402A. In the remapped convolution kernel 402A, the pixels in the convolution kernel 402 in FIG. 2B have been remapped into an 11×11 orthogonal coordinate map of a memory space 500.

The pixels in the memory space 500 are labeled using a row-major convention in where the rows and columns refer to the rows and columns in the memory space 500. This is not to be confused with the "[row, column]" labeling of the pixels in the input image 300 in FIG. 1. In order to distinguish the two, the row, column labeling of the memory space 500 are shown without the brackets "[ ]" in the figure and are referred to using parentheses "(row, column)" in this description. Using the remapped convolution kernel 402A as a remapping template, the input image 300 pixel data is remapped into the memory space's orthogonal coordinate map of the memory space also.

Comparing the (row, column) labels in the remapped convolution kernel 402A in FIG. 3A to those in the convolution kernel 402 in FIG. 2B, one can see that all of the pixel data in the convolution kernel 402 have been remapped into the remapped convolution kernel 402A's orthogonal grid. One can see that the 121 pixels in the convolution kernel have been rearranged from the parallelogram shaped arrangement in FIG. 2B to the square shaped arrangement of FIG. 3A. The remapping will be referred to herein as the "hexagonal coordinate remapping." The shaded pixels represent the neighborhood pixels associated with the anchor pixel (6,6) defined by the Run-Length array 410 and they contain a uniform value. Each value in the Run-Length array 410 represents the number of pixels covered by the convolution kernel in each row.

In order to ensure a valid operation when image boundary pixels are smoothed, an assumption is made that all referred neighborhood pixels necessary for the operation are available. The term "image boundary pixels" refer to the pixel locations near the edge of the image that are not in the image. For example, in FIG. 2B, if the hexagonal convolution kernel on the left side were the convolution kernel h1 in FIG. 1, the pixel locations in the region C in FIG. 2B would be located outside the boundary of the input image 300 and not part of the actual input image 300. For image smoothing calculation, these pixel locations are deemed to have null values.

The image smoothing process of the present disclosure is further described in connection with FIGS. 3B through 6. The anchor pixel location (6,6) of the hexagonal convolution kernel h1 is indexed at the first input image pixel [6,6] to be processed. (See FIG. 1). Smoothing of the first input image pixel [6,6] is calculated first during the initialization procedure applying conventional convolution using the hexagonal kernel 402. The smoothed output data for the input image's first anchor pixel [6,6] is then stored in the result array R as the first output pixel SO1.

In order to complete the smoothing of the input image 300, the remaining input image pixels [6,7] through [6,17] corresponding to the anchor pixels of the convolution kernels h2 through h12 need to be processed. The last pixel to be processed in the input image 300 is input image pixel [6,17] corresponding to the anchor pixel of the hexagonal filter kernel h12. The image smoothing process will be described from this point in terms of the input image data that has been remapped into the memory space via the hexagonal coordinate remapping and the pixel data locations will reference the coordinate in the memory space's orthogonal map.

Figure 3B:
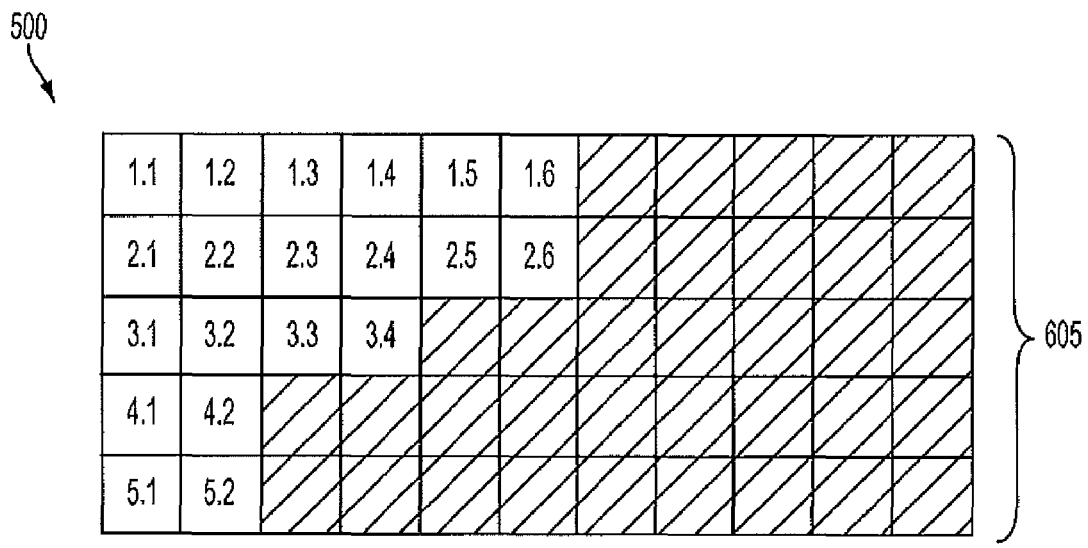
FIG. 3B illustrates the remapped convolution kernel in the memory map divided into two sections, a top section and a bottom section.

Referring to FIG. 3B, the neighborhood pixels of the anchor pixel (6,6) in the convolution kernel 402 can be conceptually separated into two sections, a top section 605 (size 5×11) and a bottom section 610 (size 6×11) in the memory space 500. As discussed above, the neighborhood pixels are those defined by the Run-Length array 410 and are shown shaded in FIG. 3B. Separating the hexagonal convolution kernel 402 into two sections reduces demand on data processing memory space (usually a fast cache memory space) especially when the convolution kernel and the input image are large. It should be noted here that the particular sizes of the convolution kernel 402 and the input image 300 being used here as examples are arbitrarily chosen to be not too large for simplification. Thus, the method described herein is applicable to images that are smaller or larger than the examples. Furthermore, one skilled in the art would appreciate that the hexagonal convolution kernel 402 can be divided into more than two sections in order to further reduce the demand on data processing memory space.

Figure 4A:
FIG. 4A illustrates the remapped convolution kernel of FIG. 3B in which each of the two sections are further divided into two subsections, one subsection representing the pixels in the anchor pixel's neighborhood and a second subsection representing the pixels that are outside the neighborhood.

As shown in FIG. 4A, the top section 605 and the bottom section 610 of each of the hexagonal filter kernel data in the memory space are further divided into two subsections based on the initially calculated Run-Length array data. FIG. 4A shows the top section 605 associated with the last anchor pixel (6,17) further divided into subsections 605A and 605B. The bottom section 610 associated with the first anchor pixel (6,6) is shown further divided into subsections 610A and 610B. The top subsection 605A represents the neighborhood pixels in the kernel image associated with the last anchor pixel (6,17) in the top section of the remapped input image 300, as represented in the memory space. In other words, as in FIG. 3B, the notation in each pixel shown in FIG. 4A represents the (row, column) location of the pixel data in the memory space of the data storage unit 220. The top subsection 605B represents the pixels that are outside the kernel image associated with the last anchor pixel (6,17) in the top section of the remapped input image 300, as represented in the memory space.

Similarly, the bottom subsection 610A represents the neighborhood pixels in the kernel image associated with the first anchor pixel (6,6) in the bottom section of the remapped input image 300, as represented in the memory space. The subsection 610B represents the pixels that are outside the kernel image associated with the first anchor pixel (6,6) in the bottom section of the remapped input image 300, as represented in the memory space. The notation A1 refers to the first anchor pixel at memory location (6,6) and A12 refers to the twelfth anchor pixel at memory location (6,17).

Figure 4B:
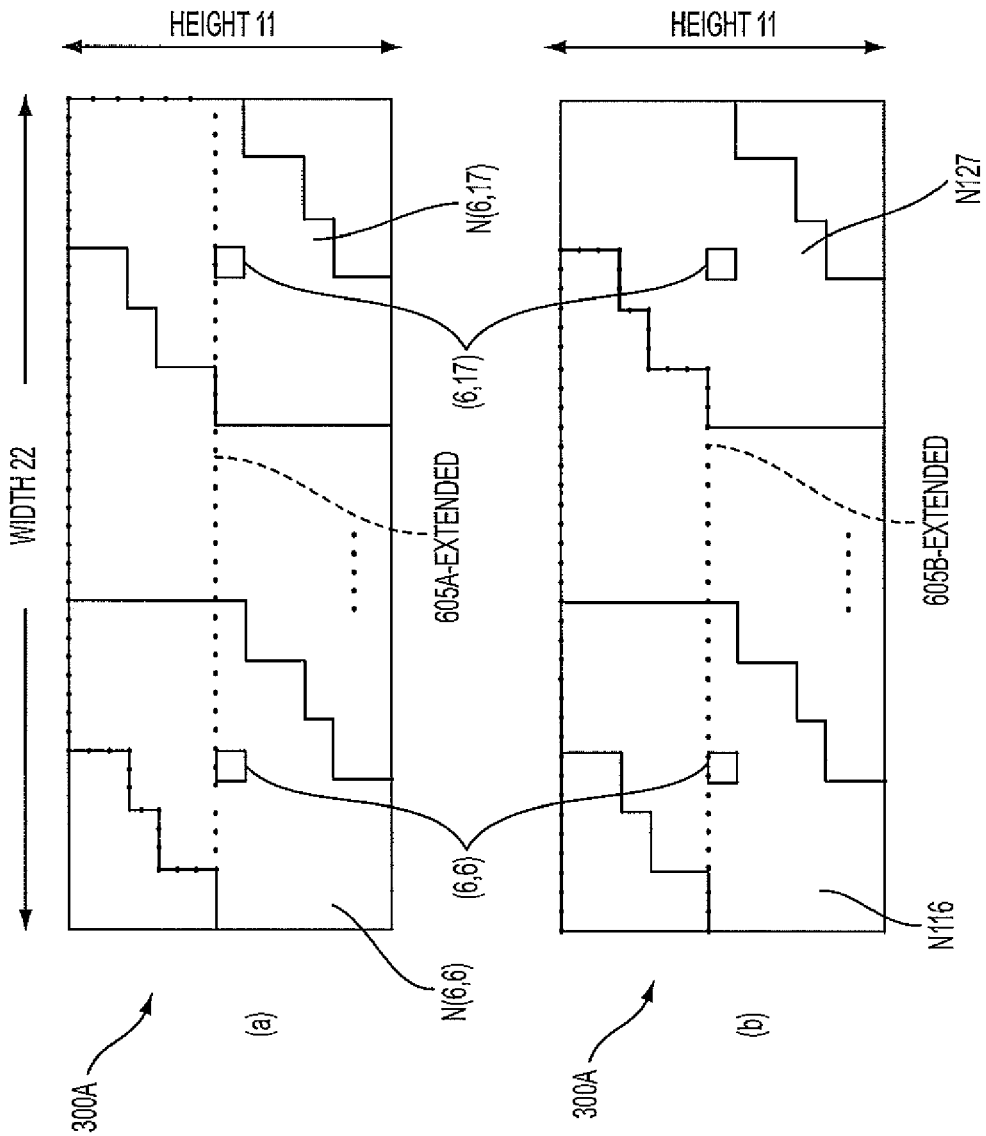
FIG. 4B illustrates the remapping of convolution kernel into memory space as shown in FIG. 3A extended to cover the whole input image of FIG. 1 and also showing the two subsections of the top section from FIG. 4A extended to cover the neighborhood pixels of all anchor pixels in the input image.

In order to carry out the image smoothing process of the present disclosure, each of the four subsections 605A, 605B, 610A and 610B need to be extended to cover all neighborhood pixels for all of the eleven remaining anchor pixels (6,7) to (6,17) in the remapped input image 300A (i.e., the input image 300 after it has been remapped into the orthogonal coordinate map of the memory space as discussed above). This is illustrated in FIG. 4B. There are eleven anchor pixels to be considered because the first image pixel [6,6], which is now located at memory space location (6,6), has already been smoothed during the initialization step as discussed above. When considering the input image 300's pixel data remapped into the memory space using the hexagonal coordinate remapping discussed above, the position of the twelve anchor pixels in the memory space's orthogonal map are (6,6) to (6,17) in the memory space's (row, column) convention.

FIG. 4B(a) shows a schematic illustration of the remapped input image 300A in which the extended top subsection 605A is shown in dotted line and labeled as 605A-extended. FIG. 4B(b) shows a schematic illustration of the remapped input image 300A in which the extended top subsection 605B is shown in dotted line and labeled as 605A-extended. The 605A-extended is aligned to the right side of the memory space or memory index decrement (from right to left) and the top subsection 605B-extended is aligned to the left side of the memory space or memory index increment (from left to right). However, in order to apply the general box filter convolution, the subsection 605B-extended need to be aligned to the right side of the memory space or memory index decrement, same as the subsection 605A-extended. This can be realized by loading the non-aligned' pixel data for the subsection 605B-extended from a main memory space (such as the data storage unit 220 shown in FIG. 7) location to a temporary cache memory (which is generally smaller memory but has much faster access time) and aligning the pixel data from the cache memory in order to same computation time. The cache memory can be provided as part of the data storage unit 220 or as a separate memory device.

The two subsections 605A-extended and 605B-extended can have overlap of the memory space as shown. For reference, FIGS. 4B(a) and (b) also show the outlines of the neighborhood pixels $N_{(6,6)}$ and $N_{(6,17)}$ under the convolution kernel (per the calculated Run-Length array) associated with the first anchor pixel (6,6) to be smoothed and the last anchor pixel (6,17) to be smoothed, respectively.

Figure 5:
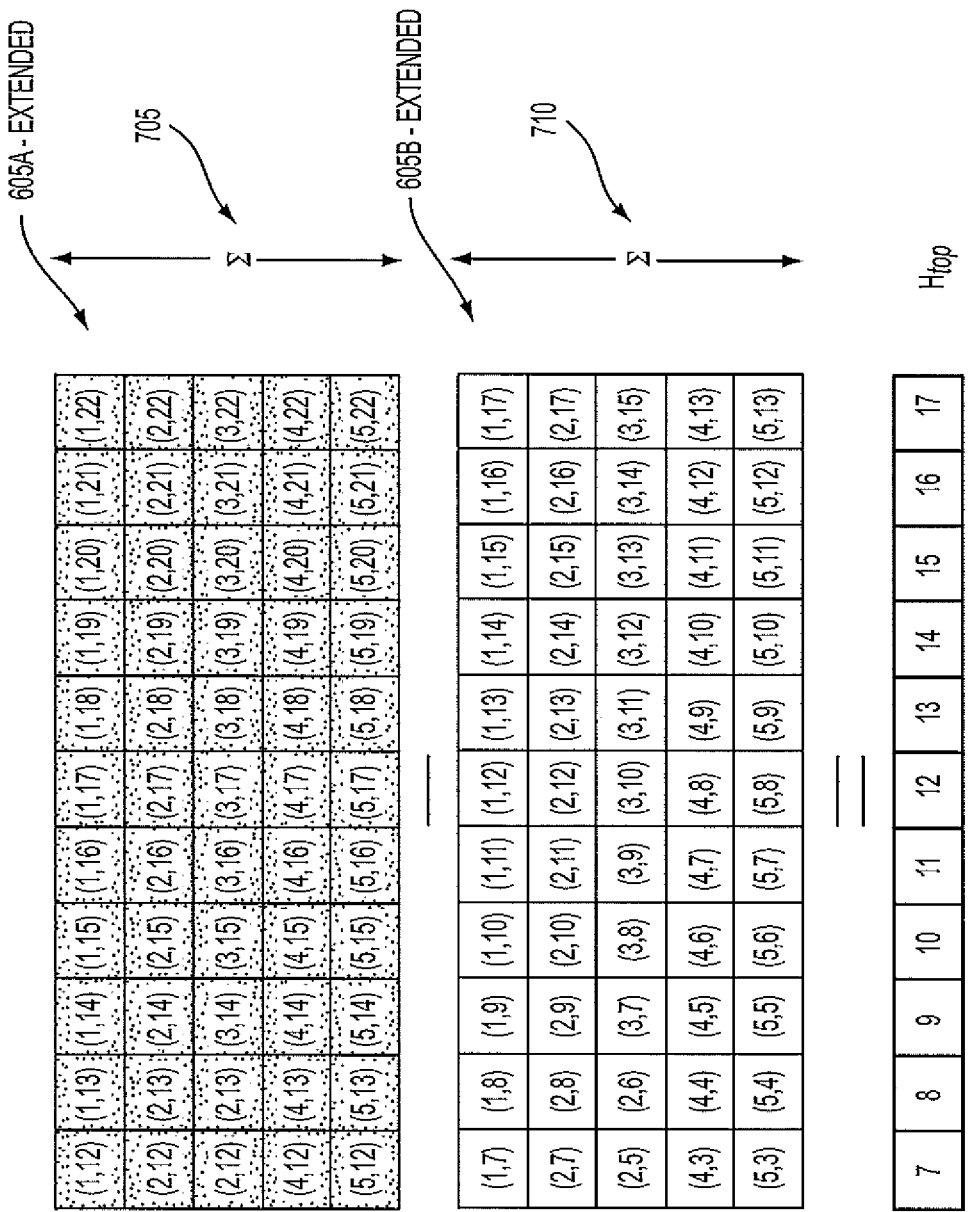
FIGS. 5 and 6 illustrate the image smoothing process of the present disclosure being applied once the input image pixel data and the hexagonal convolution kernel image are remapped and realigned to enable application of a box filter convolution strategy.

FIG. 5 shows both the top subsections 605A-extended and 605B-extended aligned to the right side of the memory space in the decremented order and ready for further processing. With both of the top subsections aligned in decremented order, we can calculate the convolution kernel values for the top portions of the neighborhood pixels associated with each of the eleven remaining anchor pixels efficiently. First, summation operations 705 and 710 are performed to sum the values of the pixels in each column in the top subsections 605A-extended and in the top subsection 605B-extended, respectively. The number of columns in each of the two top subsections 605A-extended and 605B-extended is same as the total number of anchor pixels in the input image 300 minus 1, which in this case is 11. Then, the summed column values of the top subsection 605B-extended are subtracted from the summed column values of the top subsection 605A-extended and the subtraction results are placed in a temporary buffer array $H_{top}$. The temporary buffer array $H_{top}$ holds eleven values, each value representing the difference in the kernel values for the top portion of the kernel between one kernel and the next kernel in the sequence. These differences represent the difference in the kernel values from one kernel to the next associated with the anchor pixels (6,7) to (6,17) if one were to perform convolution for each of the anchor pixels individually in sequence. For example, referring to the illustration in FIG. 4B(a), after a convolution is performed on the neighborhood pixels $N_{(6,6)}$ for the first kernel, in order to perform a convolution on the neighborhood pixels for the next kernel in sequence, i.e. $N_{(6,7)}$, the kernel image is shifted one pixel to the right so that the kernel image is now centered over the next anchor pixel (6,7). Shifting the kernel image one pixel to the right is same thing as adding a column of neighborhood pixels on the right side of the kernel image while subtracting a column of pixels on the left side of the kernel image. Therefore, the effective change between the value of the first kernel to the next is effectively the difference between the column of neighborhood pixels added on the right side and the column of neighborhood pixels subtracted on the left side. Thus, the values in the array $H_{top}$ represent the differences in the kernel values from one kernel to the next associated with the anchor pixels (6,7) to (6,17) if one were to perform convolution for each of the anchor pixels individually in sequence.

The computation of the temporary buffer array $H_{top}$ is shown in Equation 1 as follows:

$$H_{top}[i] = \sum_{k=1}^{(hex-1)/2} TopSection1[k][i] - \sum_{k=1}^{(hex-1)/2} TopSection2[k][i] \quad \text{(Eq. 1)}$$

where hex refers to hexagonal kernel size and i refers to a number of anchor pixels minus 1, range from 17 to 7 (i.e., in decremental order from right to left starting from the position of the last of the twelve anchor pixels to the second anchor pixel in the input image 300). "TopSection1" refers to the top subsection 605A-extended and "TopSection2" refers to the top sub-section 605B-extended.

Similarly, the two bottom subsections 610A-extended, 610B-extended are aligned in the incremental order (from left to right) to facilitate implementing the box filter convolution. Similar to the summing operations performed on the two top subsections 605A-extended and 605B-extended, the columns in each of the bottom subsections 610A-extended, 610B-extended are also summed. Then, the summed column values of the bottom subsection 610B-extended are subtracted from the summed column values of the bottom subsection 610A-extended and the subtraction results are placed in a temporary buffer array $H_{bot}$. The length of the array $H_{bot}$ is the total number of anchor pixels in the pixel row 6 in the input image 300 minus 1. The computation of the temporary buffer $H_{bot}$ is shown in Equation 2 as follows:

$$H_{bot}[i] = \sum_{k=1}^{1+(hex-1)/2} BottomSection1[k][i] - \sum_{k=1}^{1+(hex-1)/2} BottomSection2[k][i] \quad \text{(Eq. 2)}$$

where hex refers to hexagonal kernel size and i refers to the number of anchor pixels minus 1, range from 7 to 17 (i.e., in incremental order from left to right starting from the second anchor pixel position to the last of the twelve anchor pixels in the input image 300). "BottomSection1" refers to the bottom subsection 610A-extended and "BottomSection2" refers to the bottom subsection MOB-extended.

Figure 6:
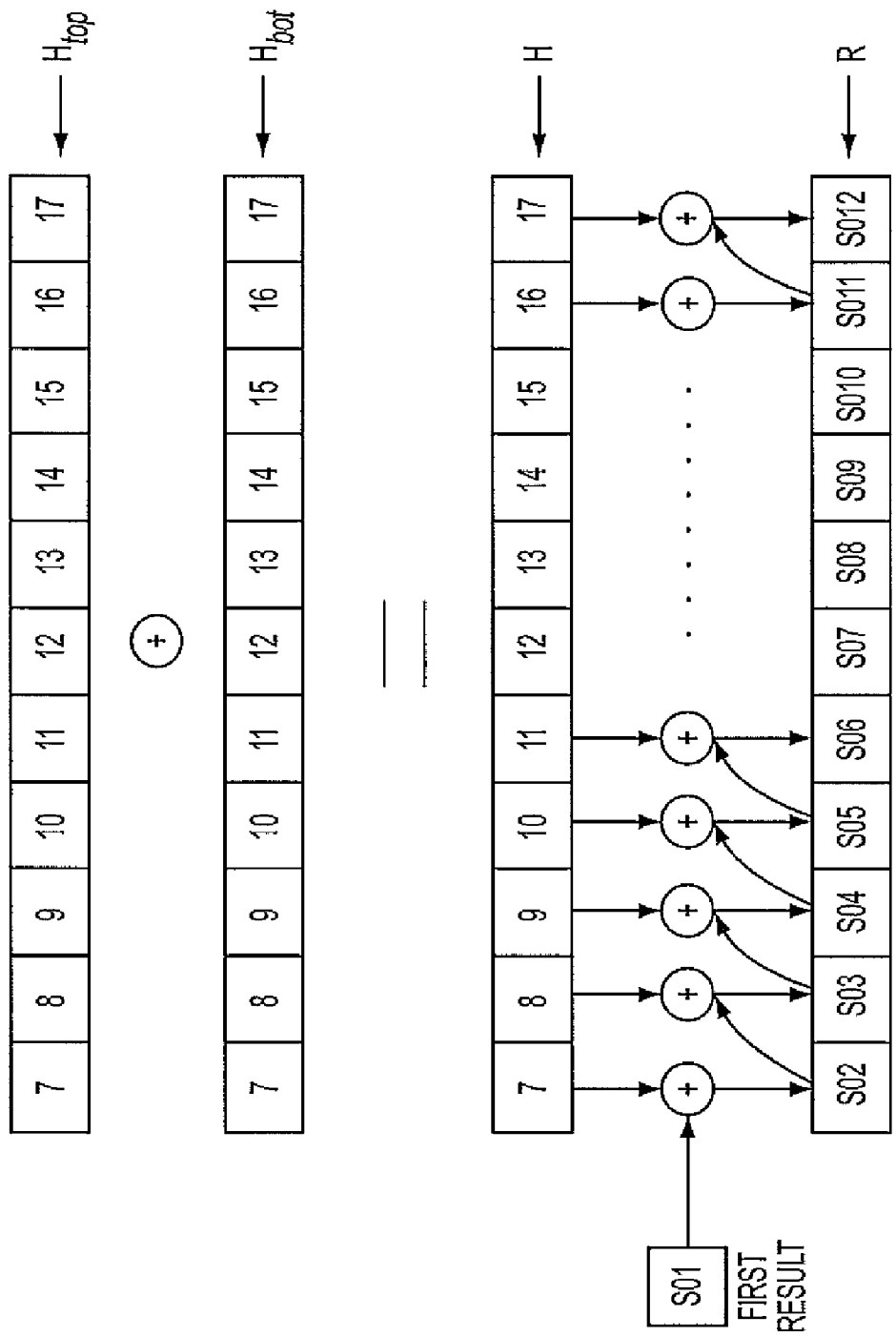

Next, referring to FIG. 6, since the arrays $H_{top}$ and $H_{bot}$ contain the differences in the kernel values from one kernel to the next associated with the anchor pixels (6,7) to (6,17) for the top portion and the bottom portion of the input image data, the arrays $H_{top}$ and $H_{bot}$ are added together to obtain a temporary summed array H. Thus, the array H contains the differences in the kernel values from one kernel to the next associated with the anchor pixels (6,7) to (6,17). This process can be shown in Equation 3 as follows:

$$H[i]=H_{bot}[i]+H_{top}[N-i], N:\text{ImageSize}-hex \quad \text{(Eq. 3)}$$

where hex refers to hexagonal kernel size and r refers to the number of anchor pixels minus 1, range from 7 to 17. Because the total number of anchor pixels in this example is 12, the N−i indexing means that the $H_{top}$ is aligned from left to right when $H_{bot}$ is aligned from right to left, so array $H_{top}$ is flipped before being added to array $H_{bot}$. The summed array H consists of elements H[7] through H[17].

Once the array H is obtained, a box filter convolution strategy can be applied to complete the image smoothing. As mentioned above, smoothing of the input image's first anchor pixel [6,6] was pre-calculated during the initialization step and already stored in the result array R as the first output pixel SO1. Such output pixel SO1 is the output image for the first kernel image h1. The value of the first smoothed output pixel SO1 is added to the first element H[7] of the summed array H to obtain the second smoothed output pixel SO2, which is the output image for the second kernel image h2. The value of the second smoothed output pixel SO2 is then added to the second element H[8] to obtain the third smoothed output pixel SO3, which is the output image for the third kernel image h3. This operation is repeated until all anchor pixels are smoothed, generating smoothed output pixels SO1 to SO12 for kernel images h1 through h12 corresponding to the anchor pixels [6,6] through [6,17] in the input image 300.

There are many ways to implement a box filter efficiently. For example, the image pixels of the hexagonal convolution kernel images h1 ... h12 can be moved in the memory space from left to right by subtracting pixels at the left-most side in the column of the box kernel and adding pixels at the next column of the image at the right side of the kernel box. In general, the operations by subtraction and addition can be added up by a number of elements in the column (kernel size). If the box kernel size is K pixels, the total operations per output pixel is 2*K without counting overhead. In other words, the output pixel is the weighted sum of neighboring input pixels. In contrast, the convolution takes $K^2$ operations (multiply-additions). By organizing pixel data elements into arrays and creating loop blocking by transforming the memory domain of misalignment into smaller chunks of aligned memory space to maximize data reuse, the performance for image smoothing can be improved for any shape of convolution kernel. Given the box kernel size K, the total operation per output pixel is 2*(K+1) without counting overhead of rearranged pixels. The box filter is able to accelerate the performance of a geometric shape point-spread-function (G-PSF) in the 3D iterative SPECT reconstruction. The rearranged image pixels can be applied to a general box filter convolution without substantial performance penalties during memory access. The box filter attenuates the high-spatial frequency components of an image and has little effect on the low-frequency components. The effect of passing an image through a low-pass filter is a slight blurring.

Figure 7:
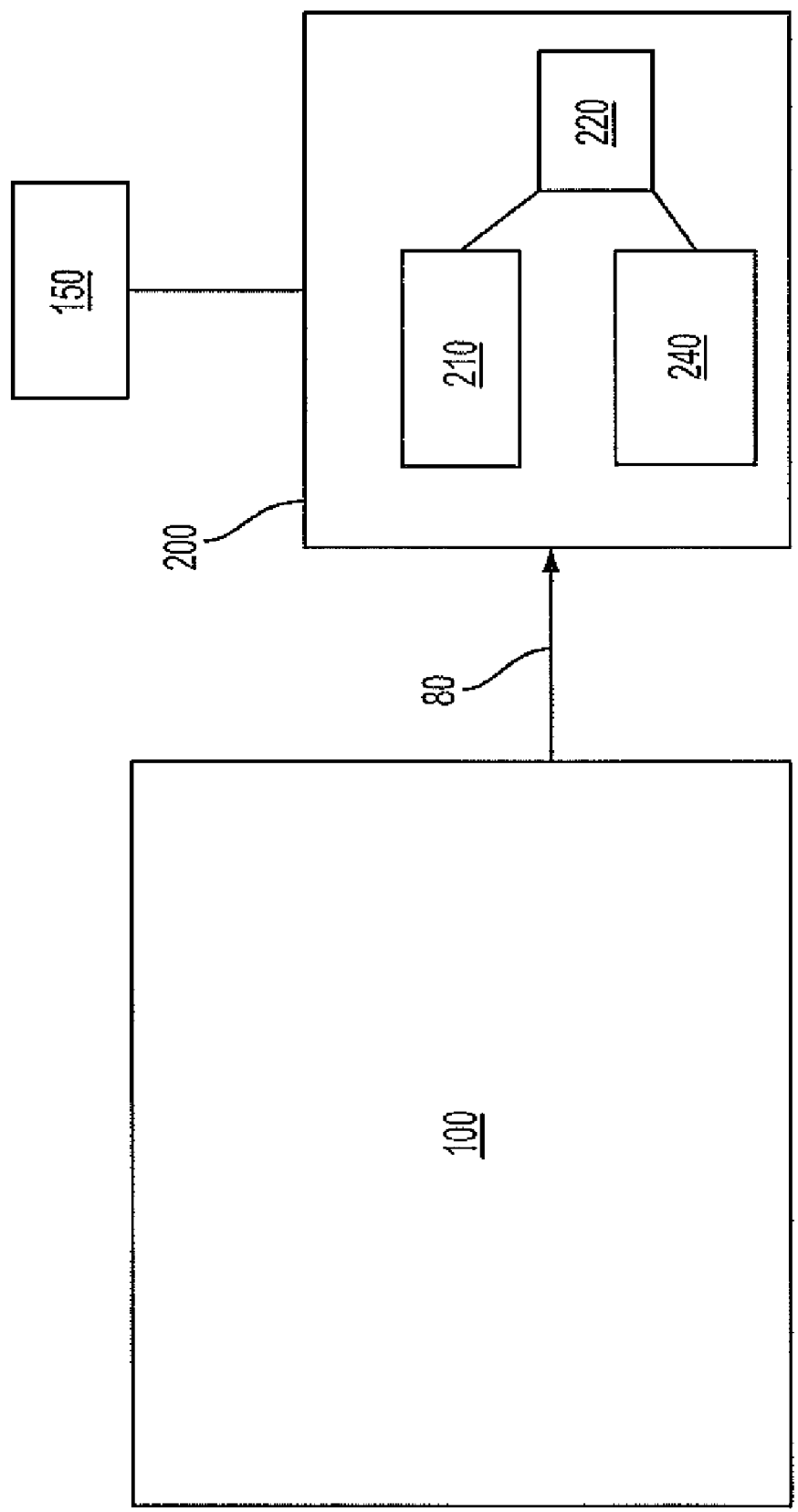
FIG. 7 is a block diagram that illustrates an example of a SPECT system architecture in which the method of the present disclosure can be implemented.

Referring to a schematic diagram of FIG. 7, the method of the present disclosure is envisioned as being carried out in a SPECT system by an image processor 240 of a SPECT system controller 200. The SPECT system controller 200 is a computer that can comprise a central processor 210 for managing and executing various programs necessary for the operation of the SPECT system 100, the image processor 240 for executing the image processing described here, and a data storage unit 220. The data storage unit 220 can be a single component unit or, if appropriate, can comprise multiple components that collectively provide the data storage unit 220 the ability to store information permanently and/or temporarily as necessary. For example, the data storage unit 220 can include one or more suitable storage components for holding firmware and other programs required for the operation and management of the SPECT system 100. The data storage unit 220 can also include fast access data storage hardware such as cache memory devices for temporarily holding data for purposes of performing convolution calculations on the data fast. In the present case, the image pixel data would be temporarily stored in the data storage unit 220 in order to perform the image convolution described in this disclosure. The data storage unit 220 can also include more permanent data storage devices for storing information. Regardless, the data storage unit 220 can include any appropriate computer readable data storage medium in which a set of instructions (e.g. a software program) is tangibly embodied thereon. The set of instructions when executed by a computer processor such as the image processor 240, the image processor performs the image smoothing method of the present disclosure. By implementing the method of the present disclosure, the image processor 240 is able to smooth the input image 300 using the non-rectangular convolution kernel 402 using a general box filter convolution strategy without substantial performance penalties during memory access. The SPECT system controller 200 receives a SPECT image data 80 from the SPECT system 100, processes the image data 80 and the image processor 240 converts the image data into an input image 300 and can display the image on the display 150.

The input image 300 is stored in the data storage unit 220. The image data may include one or more kernel images discussed above.

The image smoothing method disclosed herein can be implemented in software, hardware, or a combination thereof as a set of instructions tangibly embodied in any computer readable storage medium such as the data storage unit 220 or other portable medium, e.g. compact disks, flash memory devices, etc., provided external to the SPECT system controller 200. When the image processor 240 executes the instructions, the image processor 240 performs the image processing method described herein.

Figure 8:
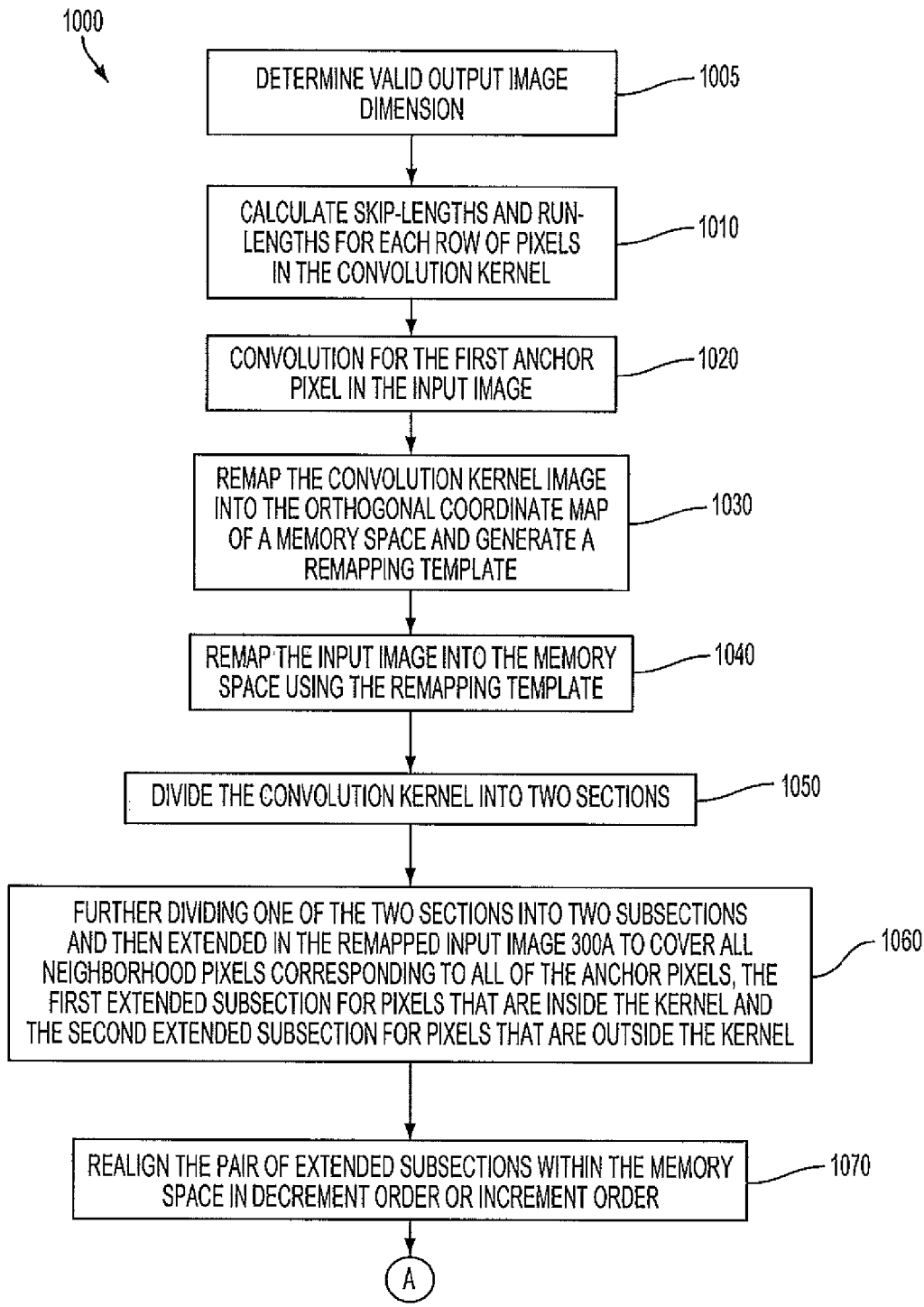
FIG. 8 is a high-level flow chart that illustrates an embodiment of the method of the present disclosure.
Figure 8:
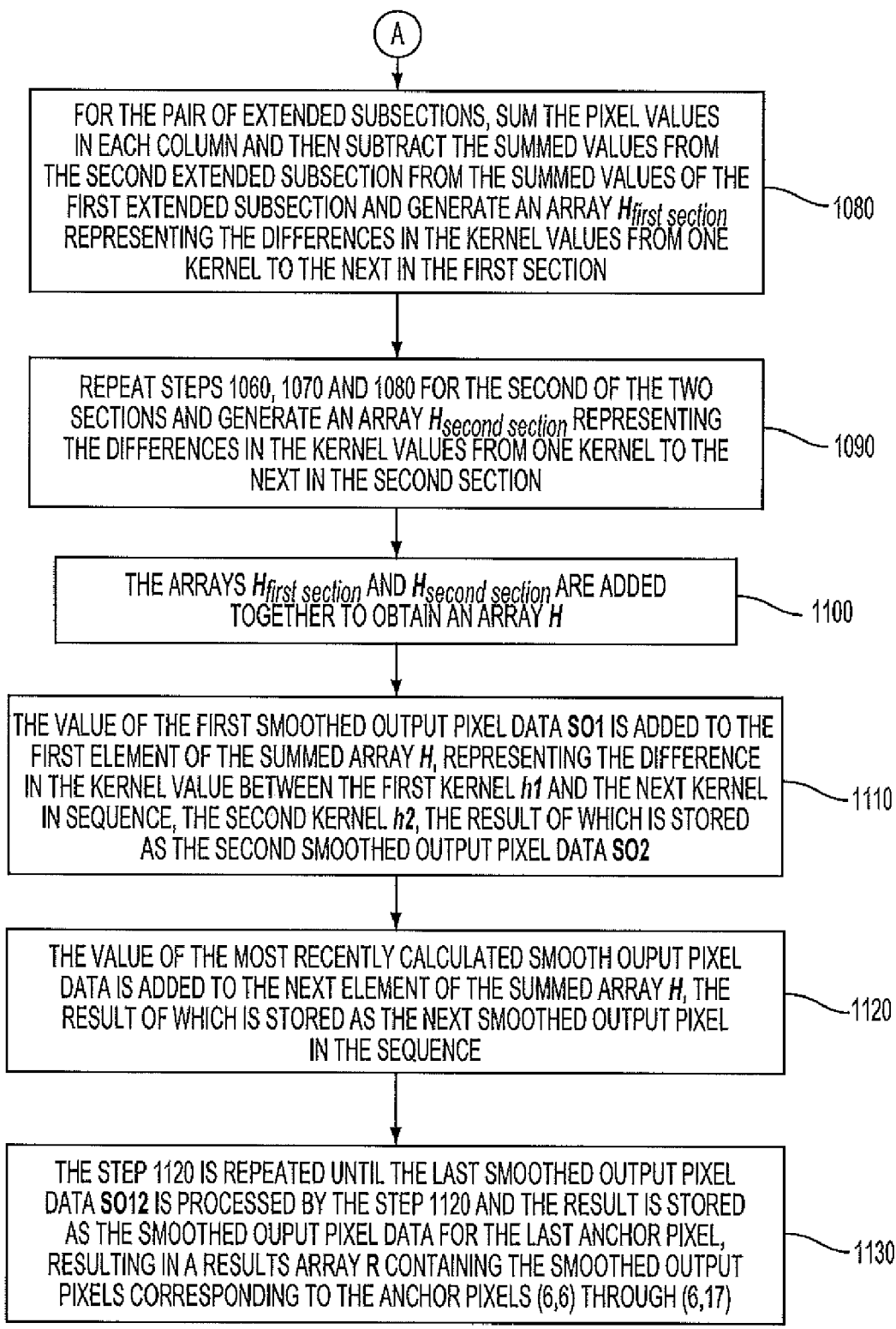

FIG. 8 is a high-level flow diagram 1000 that illustrates the image smoothing process of the present disclosure referring to the exemplary input image 300 and the hexagonal filter kernel image 402. The image processor 240 first determines a valid output image dimension based the input image 300 and the filter kernel image 402. (See Box 1005). For example, a valid output image dimension for the input image 300 is 1×12 based on a 11×22 input image and an 11×11 kernel image. The image processor 240 calculates the Skip-Lengths and Run-Length values for each row of pixels in the convolution kernel image 402 for the Skip-Length array 405 and the Run-Length array 410. (See box 1010). The calculated Skip-Length array 405 and Run-Length array 410 data is stored as a data table in a suitable memory such as the data storage unit 220 accessible to the image processor 240. As part of the initialization process, the image processor 240 performs convolution for the first anchor pixel in the input image using the convolution kernel 402 and stores the smoothed output pixel data in the result array R as smoothed output pixel SO1. (See box 1020). The convolution kernel 402 is remapped into the orthogonal coordinate map of a memory space using the hexagonal coordinate remapping described above to generate a remapping template. (See box 1030). Using the remapping template, the input image 300 pixel data is remapped into the orthogonal coordinate map of the memory space. (See box 1040). Next, the remapped convolution kernel in the memory space is defined into at least two sections, a top section 605 and a bottom section 610 so that operation on the convolution kernel can be conducted on one section at a time to reduce the demand on the memory space during computation. (See block 1050). Next, one of the two sections, the top section 605 or the bottom section 610, is further defined into two subsections, grouping the pixels in each of the two sections into a first subsection that are inside the kernel image 402 and a second subsection that are not in the kernel image 402. These subsections are then extended to subsections (e.g. 605A-extended, 605B-extended, 610A-extended, 610B-extended) to cover all neighborhood pixels corresponding to all of the anchor pixels in the remapped input image 300A. (See block 1060). Next, the extended subsections are realigned within the memory space so that each pair of subsections (i.e. 605A-extended and 605B-extended; 610A-extended and 610B-extended) in each of the top and bottom sections in the remapped input image 300A are aligned in decremental order or incremental order. (See block 1070). For each pair of extended subsections, the pixel values in each column are summed first and then the summed values from the extended subsection (605B-extended, 610B-extended) representing the pixels that are outside the kernel image are subtracted from the summed values from the extended subsection (605A-extended, 610A-extended) representing the pixels that are inside the kernel image, thus, generating an array (one of $H_{top}$ or $H_{bottom}$ depending on which pair of subsections were processed) representing the differences in the kernel values from one kernel to the next associated with the remaining anchor pixels (i.e. all anchor pixels minus the first one for which the smoothed value has already been calculated) for the corresponding top or bottom portion of the input image data. (See block 1080). Next, the steps in blocks 1060, 1070 and 1080 are repeated for the second section (605 or 610 depending on which section was processed first) generating a second array (the other of $H_{top}$ or $H_{bottom}$). (See block 1090). Next, the arrays $H_{top}$ and $H_{bottom}$ are added together to obtain an array H which represents the differences in the kernel values from one kernel to the next associated with the anchor pixels (6,7) to (6,17), i.e. the remaining anchor pixels other than the first anchor pixel (6,6). (See block 1100).

Now the box filter convolution strategy is applied to the array H to obtain the smoothed data for the remaining anchor pixels. The value of the first smoothed output pixel SO1 is added to the first element of the summed array H, representing the difference in the kernel value between the first kernel h1 and the second kernel h2, and obtain the second smoothed output pixel SO2. (See block 1110). The value of the second smoothed output pixel SO2 is then added to the second element of the summed array H, representing the difference in the kernel value between the second kernel h2 and the third kernel h3. (See block 1120). This operation is repeated until the last smoothed output pixel data SO12 is processed by the step 1120 and the result is stored in the data storage unit 220 as the last smoothed output pixel data for the last anchor pixel, i.e. pixel (6,17). This process produces the results array R containing the smoothed output pixels SO1 to SO12 corresponding to the anchor pixels (6,6) to (6,17) for the hexagonal convolution kernel images h1 to h12. (See block 1130).

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. A method for smoothing a digital input image using a non-orthogonal convolution kernel image, wherein more than one convolution kernels are required to smooth the input image and each of the more than one convolution kernels having an anchor pixel which identifies the particular pixel in the input image that is to be smoothed when the convolution kernel is applied, the method comprising:
   (a) calculating Skip-Lengths and Run-Lengths for each row of pixels in the non-orthogonal convolution kernel;
   (b) performing a convolution for the first anchor pixel in the input image to obtain a first smoothed output pixel data and storing the smoothed output pixel data in a data storage unit;
   (c) remapping the convolution kernel image into an orthogonal coordinate map of a memory space and generate a remapping template;
   (d) remapping the input image into the orthogonal coordinate of the memory space using the remapping template;
   (e) dividing the convolution kernel into two sections;
   (f) further dividing one of the two sections into two subsections and extending the two subsections in the remapped input image to cover all neighborhood pixels corresponding to all of the anchor pixels, the first extended subsection representing pixels that are inside the kernel and the second extended subsection representing pixels that are outside the kernel;
   (g) realigning the pair of extended subsections within the memory space in decrement order or increment order;
   (h) for the pair of extended subsections, summing the pixel values in each column and then substracting the summed values from the second extended subsection from the summed values from the first extended subsection and generate an array $H_{first\ section}$ representing the difference in the kernel values from one kernel to the next in the first section;
   (i) repeating the steps (f)-(h) for the second of the two sections and generating an array $H_{second\ section}$ representing the differences in the kernel values from one kernel to the next in the second section;
   (j) adding the arrays $H_{first\ section}$ and $H_{second\ section}$ to obtain a summed array H representing the differences in the kernel values from one kernel to the next associated with the anchor pixels other than the first anchor pixel;
   (k) adding the value of the first smoothed output pixel data to the first element of the summed array H and storing the result as the second smoothed output pixel data in the data storage unit;
   (l) adding the value of the most recently calculated smoothed output pixel data to the next element of the summed array H and storing the result as the next smoothed output pixel data in the sequence; and
   (m) repeating the step (l) until the last element of the summed array H is processed by the step (l) and storing the result as the smoothed output pixel data for the last anchor pixel.

2. A nuclear medicine imaging system comprising:
   a system controller for managing the operation of the imaging system including generating a digital input image, the system controller further comprising an image processor for executing a set of instructions that performs a method for smoothing a digital input image using a non-orthogonal convolution kernel image, wherein more than one convolution kernels are required to smooth the input image and each of the more than one convolution kernels having an anchor pixel which identifies the particular pixel in the input image that is to be smoothed when the convolution kernel is applied, the method comprising:
   (a) calculating Skip-Lengths and Run-Lengths for each row of pixels in the non-orthogonal convolution kernel;
   (b) performing a convolution for the first anchor pixel in the input image to obtain a first smoothed output pixel data and storing the smoothed output pixel data in a data storage unit;

(c) remapping the convolution kernel image into an orthogonal coordinate map of a memory space and generate a remapping template;

(d) remapping the input image into the orthogonal coordinate of the memory space using the remapping template;

(e) dividing the convolution kernel into two sections;

(f) further dividing one of the two sections into two subsections and extending the two subsections in the remapped input image to cover all neighborhood pixels corresponding to all of the anchor pixels, the first extended subsection representing pixels that are inside the kernel and the second extended subsection representing pixels that are outside the kernel;

(g) realigning the pair of extended subsections within the memory space in decrement order or increment order;

(h) for the pair of extended subsections, summing the pixel values in each column and then substracting the summed values from the second extended subsection from the summed values from the first extended subsection and generate an array $H_{first\ section}$ representing the difference in the kernel values from one kernel to the next in the first section;

(i) repeating the steps (f)-(h) for the second of the two sections and generating an array $H_{second\ section}$ representing the differences in the kernel values from one kernel to the next in the second section;

(j) adding the arrays $H_{first\ section}$ and $H_{second\ section}$ to obtain a summed array H representing the differences in the kernel values from one kernel to the next associated with the anchor pixels other than the first anchor pixel;

(k) adding the value of the first smoothed output pixel data to the first element of the summed array H and storing the result as the second smoothed output pixel data in the data storage unit;

(l) adding the value of the most recently calculated smoothed output pixel data to the next element of the summed array H and storing the result as the next smoothed output pixel data in the sequence; and (m) repeating the step (l) until the last element of the summed array H is processed by the step (l) and storing the result as the smoothed output pixel data for the last anchor pixel.

3. A computer readable storage medium having instructions tangibly embodied thereon, the instructions when executed by an image processor of a nuclear medicine imaging system, causing the image processor to perform image smoothing operation on an input image using a non-orthogonal convolution kernel image, wherein more than one convolution kernels are required to smooth the input image and each of the more than one convolution kernels having an anchor pixel which identifies the particular pixel in the input image that is to be smoothed when the convolution kernel is applied, the image smoothing operation comprising:

(a) calculating Skip-Lengths and Run-Lengths for each row of pixels in the non-orthogonal convolution kernel;

(b) performing a convolution for the first anchor pixel in the input image to obtain a first smoothed output pixel data and storing the smoothed output pixel data in a data storage unit;

(c) remapping the convolution kernel image into an orthogonal coordinate map of a memory space and generate a remapping template;

(d) remapping the input image into the orthogonal coordinate of the memory space using the remapping template;

(e) dividing the convolution kernel into two sections;

(f) further dividing one of the two sections into two subsections and extending the two subsections in the remapped input image to cover all neighborhood pixels corresponding to all of the anchor pixels, the first extended subsection representing pixels that are inside the kernel and the second extended subsection representing pixels that are outside the kernel;

(g) realigning the pair of extended subsections within the memory space in decrement order or increment order;

(h) for the pair of extended subsections, summing the pixel values in each column and then substracting the summed values from the second extended subsection from the summed values from the first extended subsection and generate an array $H_{first\ section}$ representing the difference in the kernel values from one kernel to the next in the first section;

(i) repeating the steps (f)-(h) for the second of the two sections and generating an array $H_{second\ section}$ representing the differences in the kernel values from one kernel to the next in the second section;

(j) adding the arrays $H_{first\ section}$ and $H_{second\ section}$ to obtain a summed array H representing the differences in the kernel values from one kernel to the next associated with the anchor pixels other than the first anchor pixel;

(k) adding the value of the first smoothed output pixel data to the first element of the summed array H and storing the result as the second smoothed output pixel data in the data storage unit;

(l) adding the value of the most recently calculated smoothed output pixel data to the next element of the summed array H and storing the result as the next smoothed output pixel data in the sequence; and (m) repeating the step (l) until the last element of the summed array H is processed by the step (l) and storing the result as the smoothed output pixel data for the last anchor pixel.

\* \* \* \* \*